United States Patent
Noguchi et al.

(10) Patent No.: US 7,405,858 B2
(45) Date of Patent: Jul. 29, 2008

(54) ACOUSTO-OPTIC TUNABLE FILTER CONTROL APPARATUS AUTOMATICALLY ADJUSTING FREQUENCY AND POWER OF RADIO FREQUENCY SIGNAL

(75) Inventors: Masaji Noguchi, Kawasaki (JP); Tomohiro Ueno, Kawasaki (JP); Goji Nakagawa, Kawasaki (JP); Yutaka Kai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 16 days.

(21) Appl. No.: 11/443,114

(22) Filed: May 31, 2006

(65) Prior Publication Data
US 2007/0171505 A1  Jul. 26, 2007

(30) Foreign Application Priority Data
Jan. 20, 2006  (JP)  ............................. 2006-012520

(51) Int. Cl.
G02F 1/11 (2006.01)
G02F 1/33 (2006.01)
G02B 26/00 (2006.01)
G02B 26/08 (2006.01)

(52) U.S. Cl. ........................ 359/285; 359/305; 359/308; 359/290; 359/298

(58) Field of Classification Search ................. 359/285, 359/305, 308
See application file for complete search history.

(56) References Cited

U.S. PATENT DOCUMENTS

| | | | |
|---|---|---|---|
| 6,215,584 B1 * | 4/2001 | Yang et al. | 398/160 |
| 6,643,060 B2 | 11/2003 | Hashimoto et al. | |
| 6,728,026 B2 * | 4/2004 | Lee et al. | 359/337.11 |
| 7,292,787 B1 * | 11/2007 | Kai et al. | 398/85 |
| 7,349,632 B2 * | 3/2008 | Noguchi et al. | 398/95 |
| 2001/0008450 A1 * | 7/2001 | Nakazawa | 359/124 |
| 2004/0190904 A1 * | 9/2004 | Noguchi et al. | 398/85 |
| 2006/0269185 A1 * | 11/2006 | Noguchi et al. | 385/7 |

FOREIGN PATENT DOCUMENTS

JP  2002-368317  12/2002

* cited by examiner

Primary Examiner—Scott J. Sugarman
Assistant Examiner—Mahidere S Sahle
(74) Attorney, Agent, or Firm—Staas & Halsey LLP

(57) ABSTRACT

An AOTF control apparatus, which applies an RF signal to an AOTF to allow a selected light to pass through the AOTF, includes: a first calculating unit calculating a relationship between a frequency of the RF signal and a wavelength of the selected light based on a frequency of the RF signal that allows a reference light to pass through the AOTF; and a second calculating unit calculating a relationship between a power of the RF signal and an attenuation amount of the selected light based on an input/output power of the reference signal at the input/output of the AOTF.

14 Claims, 12 Drawing Sheets

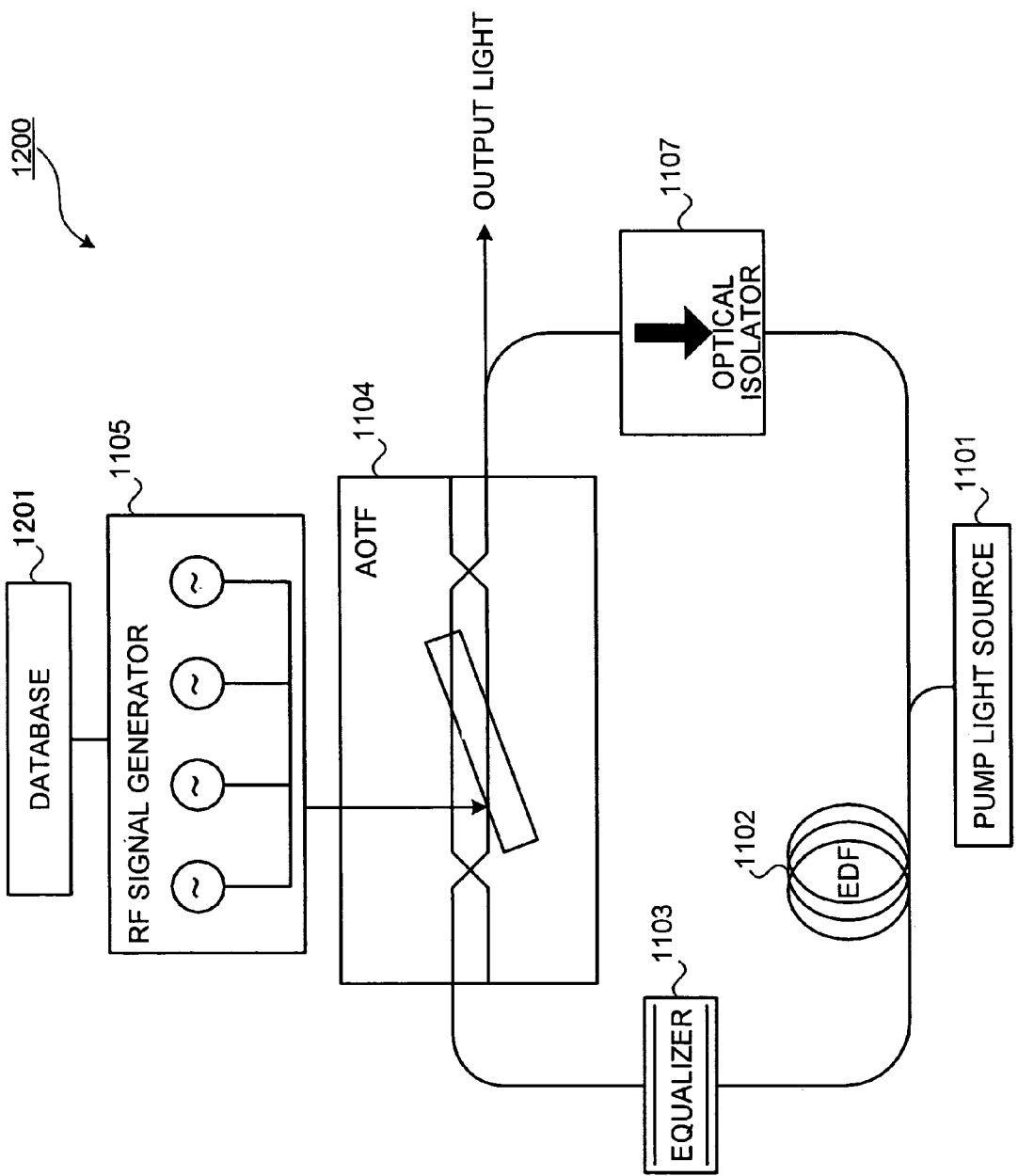

ACOUSTO-OPTIC TUNABLE FILTER CONTROL APPARATUS AUTOMATICALLY ADJUSTING FREQUENCY AND POWER OF RADIO FREQUENCY SIGNAL

CROSS-REFERENCE TO RELATED APPLICATIONS

This application is based upon and claims the benefit of priority from the prior Japanese Patent Application No. 2006-012520, filed on Jan. 20, 2006, the entire contents of which are incorporated herein by reference.

BACKGROUND OF THE INVENTION

1. Field of the Invention

The present invention relates to an acousto-optic tunable filter control apparatus for outputting an optical signal at an arbitrary wavelength from a wavelength division multiplexing (WDM) transmission signal obtained by multiplexing optical signals at different wavelengths, and an optical control method.

2. Description of the Related Art

Recently, demand for an optical communication technique capable of very long distance transmission and high capacity transmission rises following a rapid increase in the number of multimedia network users. To meet this demand, WDM that is a technique for multiplexing optical signals at different wavelengths and for transmitting signals in a plurality of channels to one optical fiber so as to increase a transmission capacity, in particular, is being used.

An optical communication network using the WDM needs to have an optical signal passing-through, splitting, and inserting function and an optical routing and cross connect function. In the former function, the optical communication network passes through, splits, and inserts an optical signal according to a need at each point on the network. In the latter function, the system selects an optical signal at a wavelength in a selected channel from the multiplexed optical signal, and outputs the selected optical signal to an optical transmission path. Accordingly, it is indispensable to do research and development according to a purpose of a user of an optical add-drop multiplexer (OADM) apparatus that passes through, splits, and inserts an optical signal. At present, as OADM apparatuses, a fixed-wavelength OADM apparatus capable of splitting and inserting an optical signal at a fixed wavelength and an arbitrary-wavelength OADM apparatus capable of splitting and inserting an optical signal at an arbitrary wavelength are provided.

As a device that realizes a necessary wavelength selecting function necessary for the OADM apparatus to perform a process for passing through and splitting an optical signal, attention is paid particularly to an acousto-optic tunable filter (hereinafter, "AOTF"). Since a selected wavelength is fixed, the AOTF operates to extract a light at the selected wavelength and can, therefore, select an arbitrary wavelength, differently from fiber grating.

FIG. 9 is an explanatory view of a configuration of the AOTF. As shown in FIG. 9, the AOTF is configured so that two optical waveguides 1-1 and 1-2 are formed on a lithium niobate (LiNbO3) substrate 1-7 that consists of a kind of ferroelectric crystal and that exhibits a piezoelectric action by titanium (Ti) diffusion. These optical waveguides 1-1 and 1-2 intersect each other at two positions, and waveguide polarization beam splitters (hereinafter, "PBS") 1-3 and 1-4 are provided at the respective intersecting positions.

A SAW guide 1-6 including a metal film is formed on the two optical waveguides 1-1 and 1-2. This SAW guide 1-6 includes an electrode (an inter digital transducer (hereinafter, "IDT")) 1-5 having interlocking comb tooth. If a radio frequency electric signal (hereinafter, "RF signal") output from an RF signal generator circuit 1-10 is applied to this IDT 1-5, a surface acoustic wave (hereinafter, "SAW") is generated. The SAW is propagated in the optical waveguides 1-1 and 1-2.

In FIG. 9, if lights at wavelengths $\lambda 1$, $\lambda 2$, and $\lambda 3$ are input to a port 1 of the AOTF, an input light hybridized in polarization modes of a TE mode and a TM mode by the PBS 1-3 is split into a light in the TE mode and that in the TM mode. The respective lights are propagated in the optical waveguides 1-1 and 1-2. If the SAW is propagated in the SAW guide 1-6 by applying an RF signal f1 at a specific frequency, refractive indexes of the two optical waveguides 1-1 and 1-2 are cyclically changed at intersecting positions, at which the optical waveguides 1-1 and 1-2 intersect the SAW guide 1-6, respectively, by an acousto-optic (AO) effect.

Accordingly, out of the input lights, the polarization mode of the light at a specific wavelength interacting with a cyclic change in the refractive index of each of the optical waveguides 1-1 and 1-2 is rotated, whereby the TE mode and the TM mode are converted into each other. The TE mode is a guided mode in which no electric field component is present in a propagation direction, and the TM mode is a guided mode in which no magnetic field component is present in the propagation direction. A rotation amount is proportional to an action length by which the light in the TE mode or that in the TM mode interacts with the change in the refractive index and a power of an RF signal. The action length is adjusted by a distance between absorbers 1-8 that are formed on the optical waveguides 1-1 and 1-2 across the IDT 1-5 and that absorb the SAW.

Namely, by optimizing the action length and the power of the RF signal, a TM mode light is converted into a TE mode light in the optical waveguide 1-1. In addition, a TE mode light is converted into a TM mode light in the optical waveguide 1-2. A forward direction of the TE mode light or TM mode light thus obtained is changed by the PBS 1-4, and the light at the wavelength interacting with the cyclic change in the refractive index is selected as a split light. FIG. 9 shows that the RF signals f1 and f2 act on the optical signals at the wavelengths $\lambda 1$ and $\lambda 2$, respectively, and that the respective lights are selected as split lights.

As explained above, the AOTF can select and split a light at a wavelength according to a frequency of each RF signal. By changing the frequency of this RF signal, the AOTF can change the wavelength of the selected light. In addition, an output light emitted from a port 2 of the AOTF corresponds to optical signals (at wavelength of $\lambda 3$) obtained by eliminating the lights at the wavelengths corresponding to the frequencies of the RF signals from the input lights incident on the port 1 of the AOTF. Therefore, the AOTF also includes a rejection function.

FIG. 10 is an explanatory view of a relationship between the RF signal and the AOTF output light. In a graph 1000 shown in FIG. 10, a horizontal axis indicates a power of the RF signal (dBm) and a vertical axis indicates a power of the AOTF output light (dBm). As evident from a characteristic curve 1001 shown in FIG. 10, if the RF signal power is changed, the AOTF output light power is changed. While the AOTF is the device that can operate to select a wavelength in response to the RF control signal, the AOTF can be used as a wavelength selection filter that includes a variable attenuation function by using this characteristic.

Techniques using the AOTF as an attenuator are already disclosed (in, for example, Japanese Patent Application Laid-open No. 2002-368317). FIGS. 11 and 12 are explanatory views of variable attenuators using conventional AOTFs, respectively. A variable attenuator 1100 shown in FIG. 11 includes a pump light source 1101, an erbium-doped fiber (EDF) 1102, an equalizer 1103, an AOTF 1104, an RF signal generator 1105, a monitor 1106, and an optical isolator 1107.

The variable attenuator 1100 demultiplexes an output light of the AOTF 1104 to lights at respective wavelengths by a coupler (not shown). Powers of demultiplexed output lights are detected by the monitor 1106. Based on this detection result, intensities (amplitudes) of frequencies f1 to f4 of RF signals applied to the AOTF 1104 are controlled so as to flatten the powers of the output lights at the respective wavelengths. By feedback-controlling the amplitudes of the RF signals based on the powers of the output lights at the respective wavelengths, intensities of SAWs generated according to the respective RF signals are changed. In addition, the powers of the output lights at the respective wavelengths selected by the AOTF 1104 are adjusted according to the intensities of the corresponding SAWs. Therefore, the powers of the output lights at the respective wavelengths are flattened, and the output lights at the respective wavelengths with the flattened power are output to an outside of the variable attenuator 1100.

A variable attenuator 1200 shown in FIG. 12 includes a database 1201 for controlling an RF signal applied to the AOTF 1104 in place of the monitor 1106 included in the variable attenuator 1100. This database 1201 records, as data, correction values of optical powers in all oscillation patterns obtained in advance by measurement or the like. The correction values recorded in the database are referred to according to the respective oscillation patterns, and the intensities of the RF signals applied to the AOTF 1104 are respectively controlled. It is thereby possible to flatten the powers of the output lights.

However, the conventional apparatus that includes the attenuation function similarly to that of the variable attenuator 1100, and that realizes the wavelength selecting function as the AOTF control apparatus has the following disadvantages. If the power of the light at the desired and selected wavelength in the WDM transmission signal input to the AOTF 1104 is high, the power of an initial output light before the light is attenuated by the AOTF 1104 can possibly be set high. If the power of the output light is set high, the optical power of the WDM transmission signal input to an apparatus connected in rear of the AOTF 1104, e.g., an optical receiver can possibly exceed an input power limit of the optical receiver while the variable attenuation function is acting. The light at the power exceeding the input power limit possibly cause damage and a deterioration in the optical receiver.

The power of the input light can be limited so as to prevent a light at an excessive power from being input to the apparatus connected in rear of the AOTF 1104 even before the variable attenuation function acts. However, this restriction makes it difficult to enable an attenuation width of the AOTF 1104 to effectively act. Besides, since the variable attenuation function of the variable attenuator 1100 has a fixed target value set for the powers of the output lights of the AOTF 1104, it is impossible to designate and set an arbitrary attenuation amount according to a user's purpose.

Furthermore, the database 1201 of the variable attenuator 1200 records, as the data, the correction values of the intensities of lights obtained in advance by the measurement or the like. The correction values recorded in the database 1201 are referred to according to the respective oscillation patterns.

The intensities of the RF signals applied to the AOTF 1104 are controlled according to the respective correction values, and the powers of the output lights are adjusted by the variable attenuation function. However, the variable attenuator 1200 fails to include a function of compensating for a secular deterioration in the AOTF 1104. As a result, a long-time reliability of the variable attenuator 1200 is not ensured. Besides, since the attenuation characteristics are irregular according to the respective AOTFs, it is necessary to measure and set the values to be recorded in the database in advance for every AOTF. This increases the number of manufacturing steps and imposes a burden on the user. This results in an increase in manufacturing cost.

SUMMARY OF THE INVENTION

It is an object of the present invention to at least solve the problems in the conventional technology.

An acousto-optic tunable filter (AOTF) control apparatus according to an aspect of the present invention applies a radio frequency (RF) signal to an acousto-optic tunable filter (AOTF) to allow a selected light included in a wavelength-division multiplexing (WDM) transmission signal to pass through the AOTF to be dropped from the WDM transmission signal. The AOTF control apparatus includes: a first calculating unit that calculates a relationship between a frequency of the RF signal and a wavelength of the selected light based on a frequency of the RF signal that allows a reference light of a predetermined wavelength to pass through the AOTF; and a second calculating unit that calculates a relationship between a power of the RF signal and an attenuation amount of the selected light based on an input power of the reference signal at the input of the AOTF and an output power of the reference signal at the output of the AOTF.

A control method according to another aspect of the present invention is a control method of an acousto-optic tunable filter (AOTF) by applying a radio frequency (RF) signal to the AOTF to allow a selected light included in a wavelength-division multiplexing (WDM) transmission signal to pass through the AOTF to be dropped from the WDM transmission signal. The control method includes: calculating a relationship between a frequency of the RF signal and a wavelength of the selected light based on a frequency of the RF signal that allows a reference light of a predetermined wavelength to pass through the AOTF; and calculating a relationship between a power of the RF signal and an attenuation amount of the selected light based on an input power of the reference signal at the input of the AOTF and an output power of the reference signal at the output of the AOTF.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 12 is another explanatory view of a variable attenuator using a conventional AOTF (part 2).

DETAILED DESCRIPTION OF THE PREFERRED EMBODIMENTS

Exemplary embodiments of the present invention will be explained in detail below with reference to the accompanying drawings.

The AOTF control apparatus according to the present invention includes an AOTF array that has a plurality of ports for inputting a WDM transmission signal, and a specific one AOTF of the AOTF array is used as a reference AOTF for calculating a relationship between an output light and an RF signal. The AOTF control apparatus monitors the input/output power of a reference signal at a predetermined wavelength when being input into/output from the reference AOTF.

To perform wavelength selection and variable attenuation, the AOTF control apparatus monitors a difference in monitored optical power between an input light (a WDM transmission signal) and an output light (a selected optical signal) of the reference AOTF, calculates a correspondence between the difference and a power of an RF signal applied to each AOTF, and records the correspondence. When receiving a request to change the power of the output light from a user, the AOTF control apparatus sets the optical power of the RF signal applied to each AOTF to be used while referring to the recorded correspondence. In addition, the apparatus calculates and sets a frequency of the RF signal for selecting a wavelength of the RF signal based on a wavelength of the reference light.

To set optical powers of output lights of the AOTFs to be used to a certain uniform target optical power, the AOTF control apparatus splits the WDM transmission signal and inputs split signals to the reference AOTF. The AOTF control apparatus adjusts the power of the RF signal applied to the reference AOTF so that the power is equal to a user's designated optical power while monitoring the output light of the reference AOTF. In addition, the apparatus sets the powers of RF signals applied to the other AOTFs using the adjusted power for the reference AOTF. By adjusting the optical powers of the RF signals through these procedures, the AOTF control apparatus can output and use the target optical power from the beginning. Two implemental embodiments of the present invention different in a configuration and procedures for deducing the relationship between the RF signal applied to each AOTF and the output light of the AOTF will be explained.

In a first embodiment of the present invention, an AOTF control apparatus calculates a relationship between a frequency of an RF signal applied to each AOTF and a wavelength of an output light of the AOTF using two reference lights, and exercises an optical control based on the calculated relationship.

Figure 1:
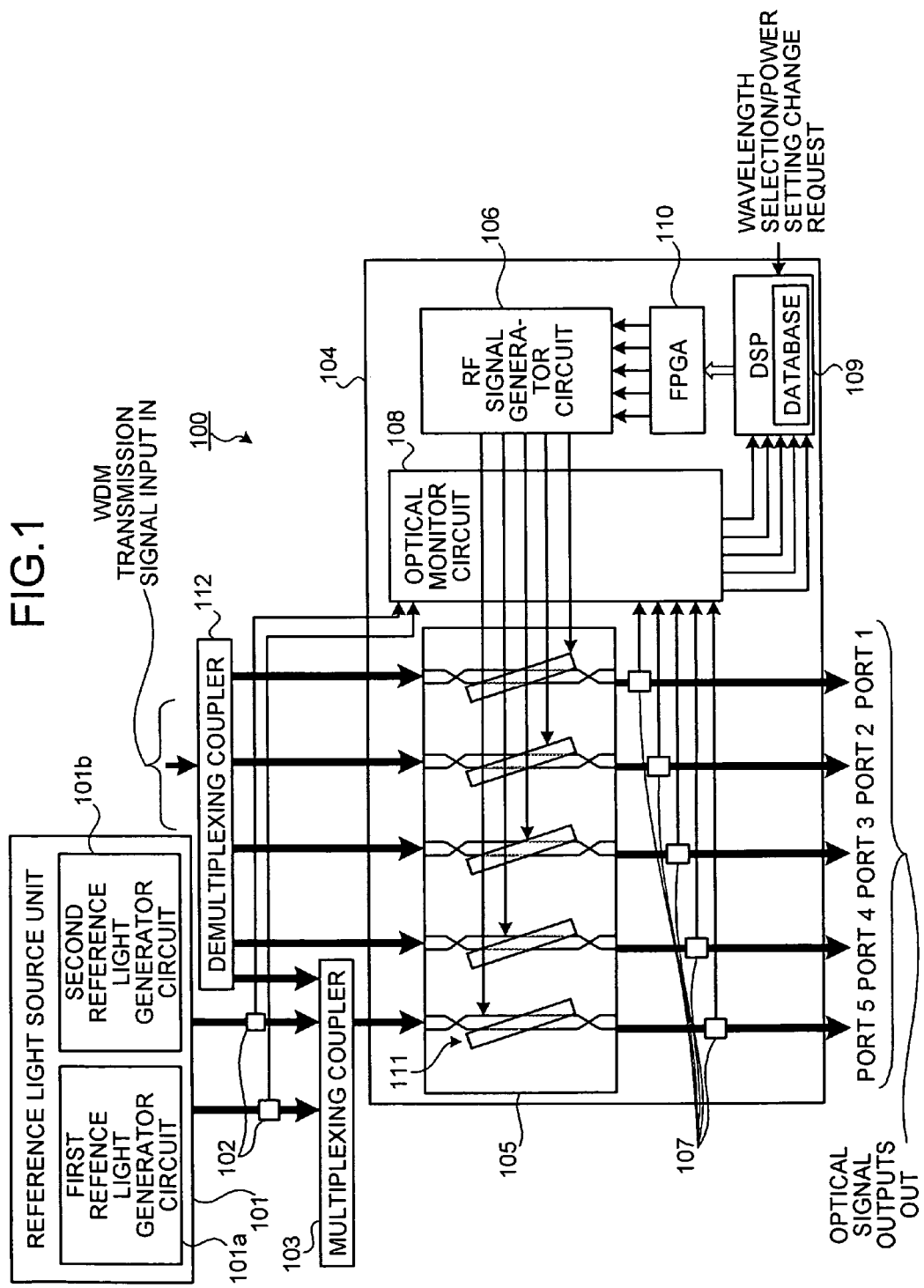
FIG. 1 is an explanatory view of a configuration of an AOTF control apparatus according to a first embodiment of the present invention.

FIG. 1 is an explanatory view of a configuration of the AOTF control apparatus according to the first embodiment. An AOTF control apparatus 100 includes a reference light source unit 101, optical taps 102, a multiplexing coupler 103, an optical control unit 104 that serves as wavelength selecting unit and a variable attenuating unit, and a demultiplexing coupler 112.

The reference light source unit 101 includes a first reference light generator circuit 101*a* and a second reference light generator circuit 101*b*. The optical control unit 104 includes an AOTF array 105, an RF signal generator circuit 106, optical taps 107, an optical monitor circuit 108, a digital signal processor (DSP) 109, and a field programmable gate array (FPGA) 110.

Each of the first reference light generator circuit 101*a* and the second reference light generator circuit 101*b* of the reference light source unit 101 outputs a reference light at a predetermined wavelength and a predetermined optical power. RF signals are applied to the AOTF array 105 while these reference lights are input to the AOTF array 105. By changing the RF signals, frequencies of the RF signals for outputting these reference lights are specified. By performing this process using the two reference lights at different wavelengths, the relationship between the frequencies of the RF signals applied to the AOTF array 105 and the wavelengths of the output lights of the AOTF array 105 can be calculated.

Generally, lights corresponding to a band from 165 megahertz to 175 megahertz, to which the frequencies of the RF signals belong, are used for a WDM transmission signal. As the reference lights, lights in bands other than this band are, therefore, used. In this embodiment, a shorter wavelength side reference light and a longer wavelength side reference light relative to the band from 165 megahertz to 175 megahertz are assumed as a first reference light at a frequency of 180 megahertz and a second reference light at a frequency of 160 megahertz, respectively.

The optical taps 102 split the reference lights output from the reference light source unit 101 and output split lights to the optical monitor circuit 108, respectively. The multiplexing coupler 103 multiplexes the reference lights input from the reference light source unit 101 with an optical signal input from the demultiplexing coupler 112, and outputs a multiplexed light to a reference AOTF 111 which is a specific one of AOTFs in the AOTF array 105 of the optical control unit 104.

If RF signals at predetermined frequencies are applied to the AOTFs in the AOTF array 105 of the optical control unit 104, the AOTFs can output optical signals at specific wavelengths from a plurality of optical signals (at wavelengths λ1 to λn) input from a WDM transmission signal input 'In' to arbitrary ports (ports 1 to 4). A port 5 among the ports 1 to 5 of the AOTF array 105 is used to acquire characteristics of the AOTF array 105 to which the reference lights are input and which exercises the optical control as the reference AOTF 111. The ports 1 to 5 will be referred to as "optical signal outputs 'OUT'".

The RF signal generator circuit 106 generates the RF signals applied to the AOTF array 105. The optical monitor circuit 108 monitors the optical signals of the respective AOTFs output to the output ports 1 to 4 of the AOTF array 105. Configurations of the RF signal generator circuit 106 and the optical monitor circuit 108 will be explained later in detail with reference to FIGS. 2 and 3, respectively.

The FPGA 110 is a programmable large-scale integrated circuit (programmable LSI device). The FPGA 110 calculates frequencies and powers of the RF signals for allowing the AOTF array 105 to output the optical signals at the predetermined wavelengths at the predetermined power in response to a wavelength selection/power setting change request input from the DSP 109. The FPGA 110 inputs calculation results to the RF signal generator circuit 106 so as to indicate the circuit 106 to generate the RF signals. At this moment, the DSP 109 controls the FPGA 110 to change over the RF signals applied from the RF signal generator circuit 106 based on monitored powers of the optical signals and the reference signals input from the optical monitor circuit 108. The optical taps 107 split the output lights of the AOTFs output to the respective ports 1 to 5, and output split lights to the optical monitor circuit 108.

The demultiplexing coupler 112 demultiplexes the WDM transmission signal input from a transmission line connected to the AOTF control apparatus 100, and outputs demultiplexed lights to the respective ports of the AOTF array 105 of the optical control unit 104. It is noted that the lights output from the demultiplexing coupler 112 are multiplexed signals obtained by dividing the WDM transmission signal (multiplexed light) by the number of ports.

Figure 2:
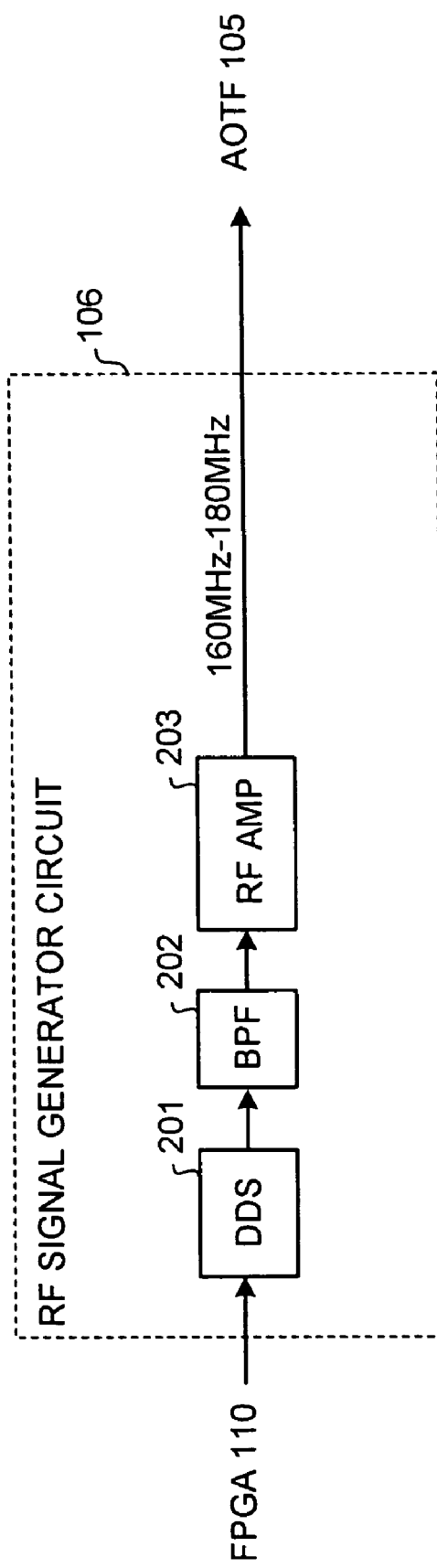
FIG. 2 is a block diagram of a configuration of an RF signal generator circuit.

FIG. 2 is a block diagram of the configuration of RF signal generator circuit 106. The RF signal generator circuit 106 includes a direct digital synthesizer (DDS) 201, a band-pass filter (BPF) 202, and a radio frequency-amplifier (RF AMP) 203.

In the RF signal generator circuit 106, the DDS 201 outputs a sine wave signal or a cosine wave signal according to setting information such as a frequency, a phase, and amplitude of each RF signal input from the FPGA 110. The BPF 202 transmits a signal in a predetermined frequency range out of the sine wave signal or cosine wave signal input from the DDS 201. The RF AMP 203 amplifies the signal input from the BPF 202, and outputs an RF signal to the AOTF array 105. The RF signal output from the RF signal generator circuit 106 is frequency-limited by the BPF 202. Therefore, the frequency of this RF signal ranges from 160 megahertz to 180 megahertz.

Figure 3:
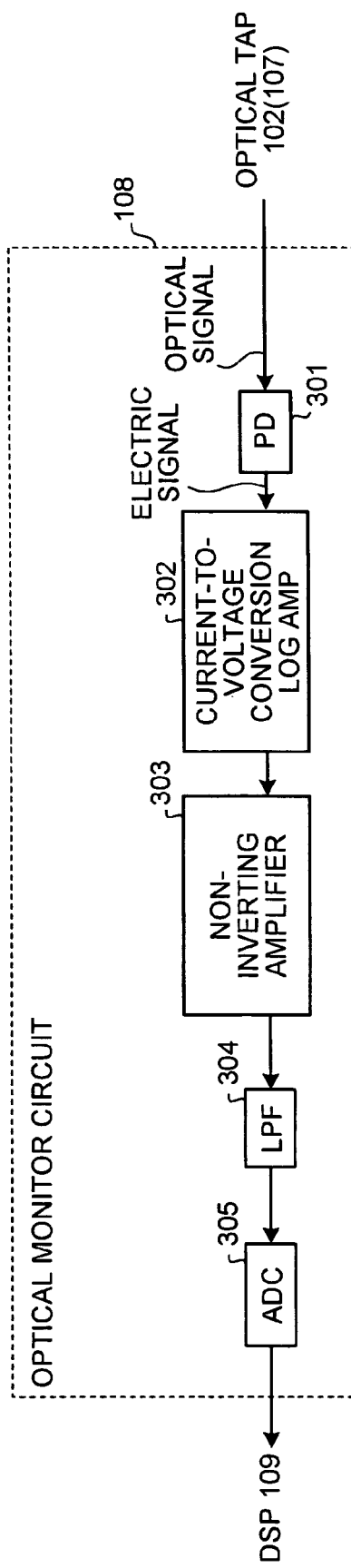
FIG. 3 is a block diagram of a configuration of an optical monitor circuit.

FIG. 3 is a block diagram of the configuration of the optical monitor circuit 108. The optical monitor circuit 108 is constituted by a light receiving element or photodiode (PD) 301, a current-to-voltage conversion log amplifier (LOG AMP) 302, a non-inverting amplifier 303, a lowpass filter (LPF) 304, and an analog-to-digital converter (ADC) 305. The optical monitor circuit 108 detects the monitored power (λref1pmon or λref2pmon described later) of a light split by each optical tap 102 and the monitored power (AOTF5 pmon x, AOTF4 pmon x, ..., and AOTF1 pmon x described later) of a light split by each optical tap 107.

In the optical monitor circuit 108, the PD 301 generates a current according to the input optical light so as to convert the light split by each optical tap 102 (107) into an electric signal. The current-to-voltage conversion LOG AMP 302 converts the current input from the PD 301 into a voltage according to log characteristics. The non-inverting amplifier 303 amplifies the voltage applied from the current-to-voltage conversion LOG AMP 302. The LPF 304 transmits a low frequency component of the voltage amplified by the non-inverting amplifier 303. A high frequency component of the voltage is, therefore, eliminated by the LPF 304. The ADC 305 converts the voltage output from the LPF 304 in the form of an analog signal into a digital signal, and outputs the digital signal to the DSP 109.

Contents of an optical control process (a wavelength selection process and an optical power control process) performed by the AOTF control apparatus 100 thus configured will next be explained. To execute the optical control, the AOTF control apparatus 100 first performs an adjustment process. Thereafter, the apparatus 100 outputs arbitrary optical signals in the WDM transmission signal according to the wavelength selection/power setting change request from the user.

Figure 4:
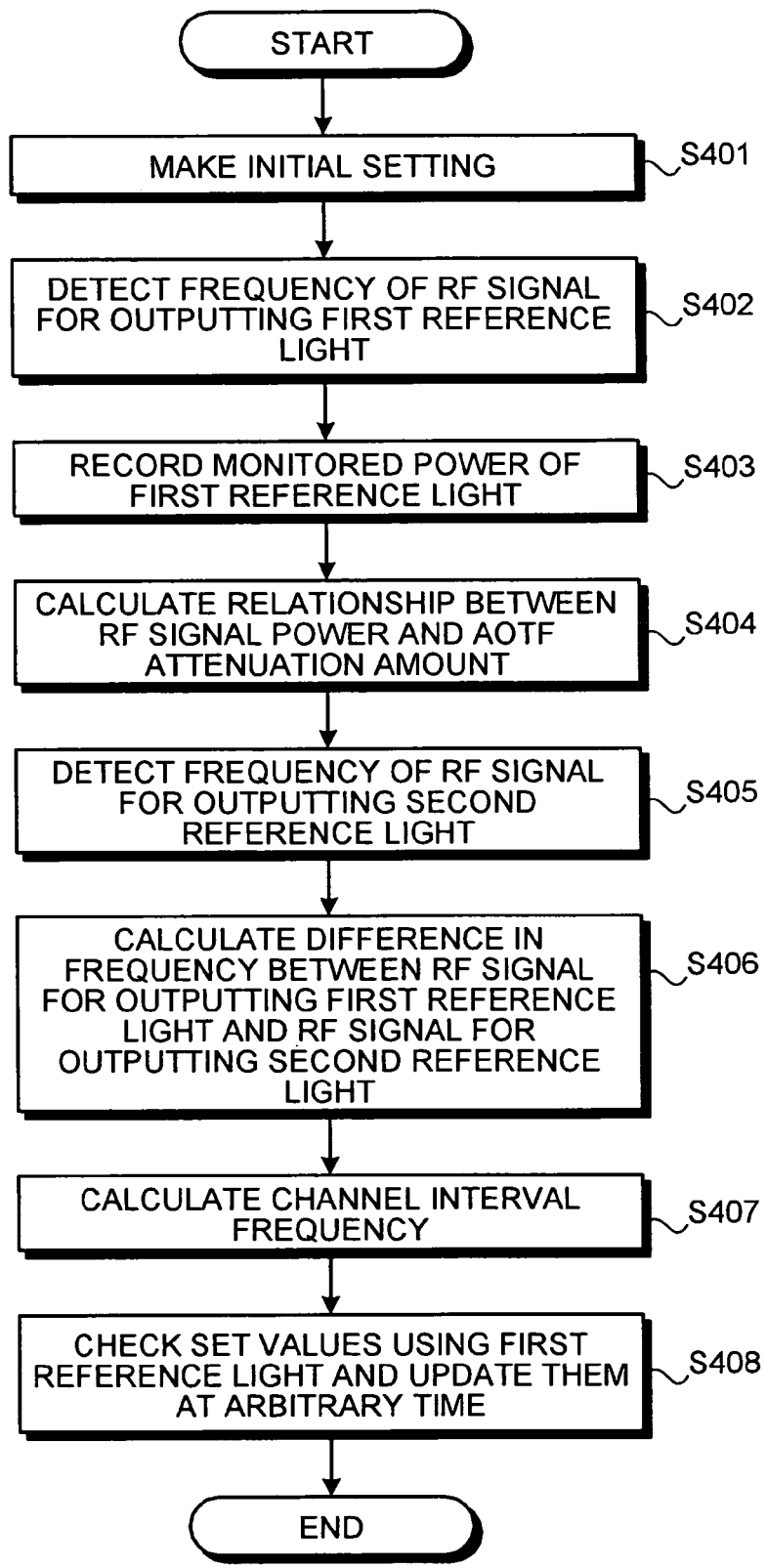
FIG. 4 is a flowchart of contents of an adjustment process performed by the AOTF apparatus according to the first embodiment.

FIG. 4 is a flowchart of the adjustment process performed by the AOTF control apparatus 100 according to the first embodiment. The apparatus 100 makes an initial setting for preparing and recording the following variables and fixed values in a database of the DSP 109 (at step S401).

| Variables | |
|---|---|
| RFref1freq | A frequency of an RF signal for outputting the shorter wavelength side reference light (first reference light) |
| RFref2freq | A frequency of an RF signal for outputting the longer wavelength side reference light (second reference light) |
| RFref1pwr x | A variable power of the shorter wavelength side reference light (first reference light) |
| RFref2pwr x | A variable power of the longer wavelength side reference light (second reference light) |
| λref1pmon | A monitored power of the shorter wavelength side reference light (first reference light) at the output of the reference light source unit |
| λref2pmon | A monitored power of the longer wavelength side reference light (second reference light) at the output of the reference light source unit |
| AOTF5 pmon x | A monitored power at the output of the reference AOTF 111 for the port 5 |
| AOTF4 pmon x | A monitored power at the output of the AOTF for the port 4 |
| AOTF3 pmon x | A monitored power at the output of the AOTF for the port 3 |
| AOTF2 pmon x | A monitored power at the output of the AOTF for the port 2 |
| AOTF1 pmon x | A monitored power at the output of the AOTF for the port 1 |
| AOTF5 loss x | An attenuation amount of the reference AOTF |
| λx | A wavelength of a light to be selected |
| Fx | A frequency of an RF signal for outputting a light at the wavelength of λx |
| Fref | A current frequency of an RF signal applied to a reference light |

| Fixed values | |
|---|---|
| RFref1pwr a | An initial value of the power of the RF signal for outputting the shorter wavelength side reference light (first reference light) (at an RF signal frequency near a smallest transmission loss measured in advance) |
| RFref2pwr a | An initial value of the power of the RF signal for outputting the longer wavelength side reference light (second reference light) (at the RF signal frequency near the smallest transmission loss measured in advance) |

-continued

| Fixed values | |
|---|---|
| λref1freq | A wavelength of the shorter wavelength side reference light (first reference light) |
| λref2freq | A wavelength of the longer wavelength side reference light (second reference light) |
| λref1pwr | A power of the output light for the shorter wavelength side reference light (first reference light) |
| λref2pwr | A power of the output light for the longer wavelength side reference light (second reference light) |
| CPL loss | A loss of the multiplexing coupler 103 |
| RFfreq d | An RF signal frequency interval (a grid interval) |
| CH SUM | The number of channel intervals of the WDM transmission signal |

The AOTF control apparatus 100 detects the frequency of the RF signal for outputting the first reference light (at step S402). Specifically, the apparatus 100 sets the initial value RFref1pwr a to the power of the RF signal applied to the reference AOTF 111 to which the first reference light is input. The apparatus 100 then reduces the frequency of the applied RF signal in scales from 180 megahertz to 1 kilohertz. The apparatus 100 detects a frequency of the RF signal that maximizes the optical power of the first reference light from detected values by the optical monitor circuit 108. The apparatus 100 records this frequency as the frequency (RFref1freq) of the RF signal for outputting the first reference light.

The apparatus 100 causes the optical monitor circuit 108 to read and record the monitored power (ref1pmon) of the first reference light at the output of the reference light source unit 101 (at step S403).

Thereafter, the apparatus 100 calculates the relationship between the RF signal power and the AOTF attenuation amount (at step S404). Specifically, the apparatus 100 applies an RF signal at the frequency (RFref1freq) for outputting the first reference light to the reference AOTF 111. The apparatus 100 reduces the power of the RF signal in 0.1-decibel scales from +10 dBm to −30 dBm, and reads and records the monitored power (AOTF5 pmon x) at the output of the reference AOTF 111 for every reduction value. Furthermore, the apparatus 100 subtracts the monitored power (λref1pmon) of the first reference light at the output of the reference light source unit 101 and the loss (CPL loss) of the multiplexing coupler 103 from the monitored power (AOTF5 pmon x) at the output of the reference AOTF 111. The apparatus 100 thereby calculates the attenuation amount (AOTF5 loss x) of the reference AOTF 111. The apparatus 100 records the relationship between the RF signal power and the attenuation amount of the reference AOTF 111 obtained by the recorded values and calculation result in the database of the DSP 109.

The apparatus 100 detects the frequency of the RF signal for outputting the second reference light (at step S405). In this process, similarly to the process at the step S402, the apparatus 100 sets the initial value RFref2pwr a to the power of the RF signal applied to the reference AOTF 111 to which the second reference light is input. The apparatus 100 then reduces the frequency of the applied RF signal in scales from 160 megahertz to 1 kilohertz. The apparatus 100 detects a frequency of the RF signal that maximizes the optical power of the second reference light from the detected values by the optical monitor circuit 108. The apparatus 100 records this frequency as the frequency (RFref2freq) of the RF signal for outputting the second reference light.

The apparatus 100 calculates a difference in frequency between the RF signal for outputting the first reference light and the RF signal for outputting the second reference light (at step S406). Namely, the apparatus 100 calculates the difference between the frequency (RFref1freq) detected at the step S402 and the frequency (RFref2freq) detected at the step S405.

Thereafter, the apparatus 100 calculates a channel interval frequency (at step S407). Namely, the apparatus 100 calculates the number of channel intervals (CH SUM (n+1+1−1)) based on the number n of channels of the WDM transmission signal to be used, a channel position of the wavelength (ref1) of the first reference light, and a channel position of the wavelength (ref2) of the second reference light. The apparatus 100 obtains an absolute value of the number of channel intervals (CH SUM (n+1+1−1)) thus calculated.

Finally, the apparatus 100 checks the values set using the first reference light and updates them at arbitrary time (at step S408), thus finishing the adjustment process. In this process, the reference AOTF 111 performs a tracking process for tracking the optimum RF signal frequency and a confirmation process for confirming the relationship between the RF signal power and the attenuation amount to calculate the optimum RF signal frequency using the first reference light so as to maintain the relationship between the optimum RF frequency and the RF signal power attenuation amount according to changes such as an environmental temperature change, a fluctuation in the light source of the WDM transmission signal, and a secular deterioration. Based on the change of the optimum RF signal frequency, the frequency of the RF signal for outputting the first reference light and that for outputting the second reference light are updated while considering relative changes in the frequency of the RF signal for outputting the first reference light and those for outputting the second reference light. According to this updating process, the frequency intervals of the RF signals corresponding to the channels of the WDM transmission signal are updated. At the same time, the database that records the relationship between the RF signal power and the output light power is updated.

Figure 5:
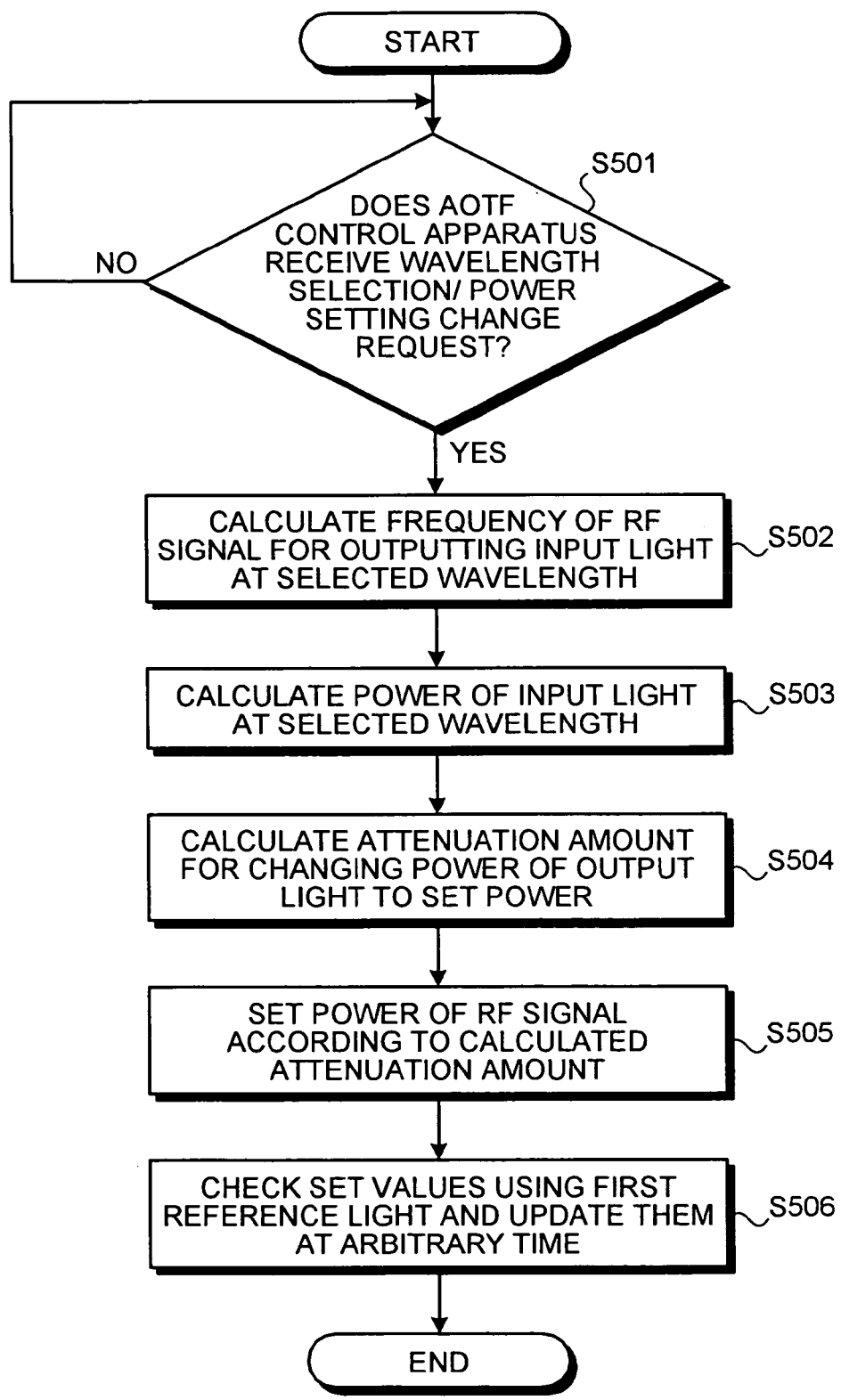
FIG. 5 is a flowchart of contents of an output light control process performed by the AOTF control apparatus according to the first embodiment.

After finishing the adjustment process having these contents, the AOTF control apparatus 100 can accept an optical control request from the user. FIG. 5 is a flowchart of contents of an output light control process performed by the AOTF control apparatus 100 according to the first embodiment. In the flowchart of FIG. 5, the apparatus 100 determines whether the apparatus 100 receives the wavelength selection/power setting change request from the user (at step S501). The apparatus 100 waits until receiving the user's wavelength selection/power setting change request (in a loop of step S501: No). If receiving the request (at step S501: Yes), the apparatus 100 calculates the frequency of the RF signal for outputting the input light at a selected wavelength (at step S502).

The process at the step S502 will be specifically explained. The apparatus 100 first calculates the frequency of the RF signal for outputting an optical signal in a selected channel based on the RF signal frequency interval corresponding to the selected channel of the WDM transmission signal and the number of channel intervals. For instance, if the wavelength of the optical signal selected so as to be passed through the port 1 is (2, a value obtained by dividing the frequency interval of the RF signal corresponding to the selected channel of the WDM transmission signal by the number of channel intervals is doubled. The resultant value is subtracted from the frequency of the RF signal for outputting the first reference light. The apparatus 100 can thereby calculate the frequency of the RF signal for outputting the optical signal at the selected requested wavelength.

The apparatus 100 then calculates a power of the input light at the selected wavelength (at step S503). Specifically, the apparatus 100 writes the frequency of the RF signal for outputting the optical signal at the selected wavelength calculated at the step S502, and the power of the RF signal at the smallest attenuation amount of the AOTF array 105 in a reference AOTF RF signal power and frequency storage register within the FPGA 110. In addition, the apparatus 100 sets the RF signal generator circuit 106 so that the RF signal at the power and the frequency thus written to the register to the reference AOTF 111. The optical monitor circuit 108 monitors the power of the output light of the reference AOTF 111, and calculates the power of the input optical power at the selected wavelength (e.g., λ2) based on this monitored power and the attenuation amount set to the AOTF array 105.

The apparatus 100 calculates an attenuation amount for changing the power of the output light to a set power (at step S504). Specifically, the apparatus 100 calculates a difference between the power of the output light set by the user and the monitored power (λref1pmon) of the output light for the first reference light. In addition, the apparatus 100 calculates a necessary attenuation amount for changing the power of the output light to the set power.

The apparatus 100 sets the power of the RF signal according to the calculated attenuation amount (at step S505). Specifically, the apparatus 100 sets the frequency of the RF signal for outputting the optical signal at the selected wavelength and the power of the RF signal for outputting the light attenuated by as much as the attenuation amount calculated at the step S504 to the RF signal generator circuit 106. At this step, the apparatus 100 makes this setting under conditions that the power of the input light of the AOTF array 105 is higher than a sum of a desired output power and a minimum attenuation amount of the AOTF array 105.

Finally, the apparatus 100 checks the set values using the first reference light and updates them at arbitrary time (at step S506), thus finishing the output light control process. This process is performed so as to maintain the relationship between the optimum RF signal frequency and the attenuation amount of the RF signal power for outputting the optical signal at the selected wavelength according to the changes such as the environmental temperature change, the fluctuation in the light source of the WDM transmission signal, and the secular deterioration. Specifically, the reference AOTF 111 performs the tracking process for tracking the optimum RF signal frequency and the confirmation process for confirming the relationship between the RF signal power and the attenuation amount using the first reference light. In addition, based on the change of the optimum RF signal frequency, the frequency of the RF signal for outputting the first reference light and that for outputting the second reference light are updated while considering relative changes in the frequency of the RF signal for outputting the first reference light and those for outputting the second reference light. Based on this updating process, the database that records the RF frequency intervals and the relationship between the RF signal power and the output power is updated. According to these updating processes, the frequency intervals of the RF signal corresponding to the channels of the WDM transmission signal are updated. At the same time, the database that records the relationship between the RF signal power and the output power is updated. The AOTF control apparatus 100 can thereby operate with high accuracy.

In a second embodiment of the present invention, the AOTF control apparatus exercises an optical control by calculating a relationship between the frequency of the RF signal and the wavelength of the output light of the AOTF array 105 using one reference light and temperature information on the AOTF array 105. Generally, output characteristics of the AOTF depend on temperature. In the second embodiment, therefore, a relational equation that indicates a change in the frequency of the RF signal in every channel of the WDM transmission signal selected by the AOTF control apparatus according to temperature.

Figure 6:
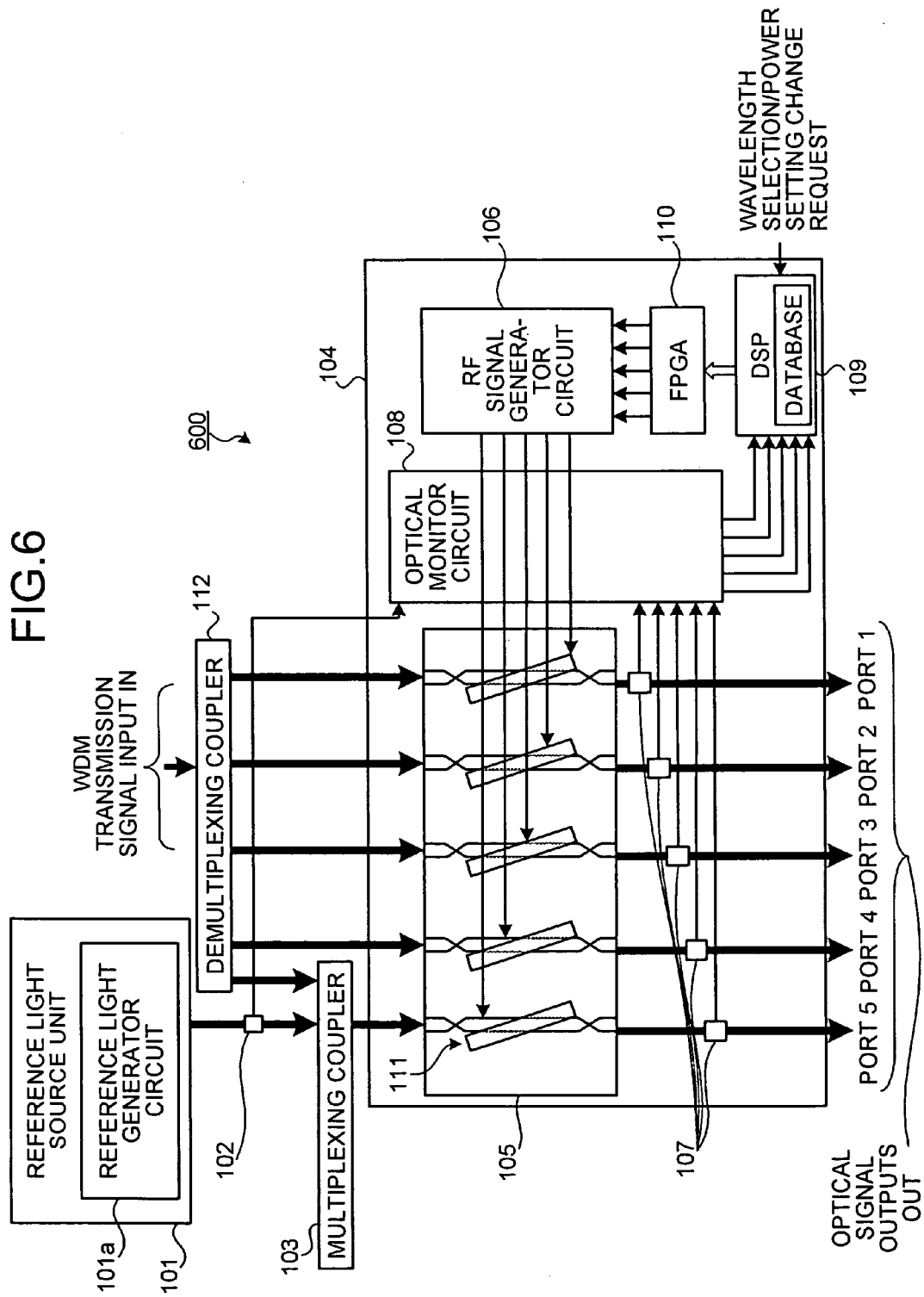
FIG. 6 is an explanatory view of a configuration of an AOTF control apparatus according to a second embodiment of the present invention.

FIG. 6 is an explanatory view of a configuration of an AOTF control apparatus according to the second embodiment of the present invention. An AOTF control apparatus 600 shown in FIG. 6 is configured, differently from the apparatus 100 (shown in FIG. 1), so that the reference light source unit 101 is constituted only by one reference light generator circuit 101*a*. In addition, the apparatus 600 includes a function of acquiring temperature information on the AOTF array 105 and recording the temperature information in the DSP 109. Since the other constituent elements of the AOTF control apparatus 600 are the same as those of the apparatus 100 shown in FIG. 1, they will not be explained herein.

Figure 7:
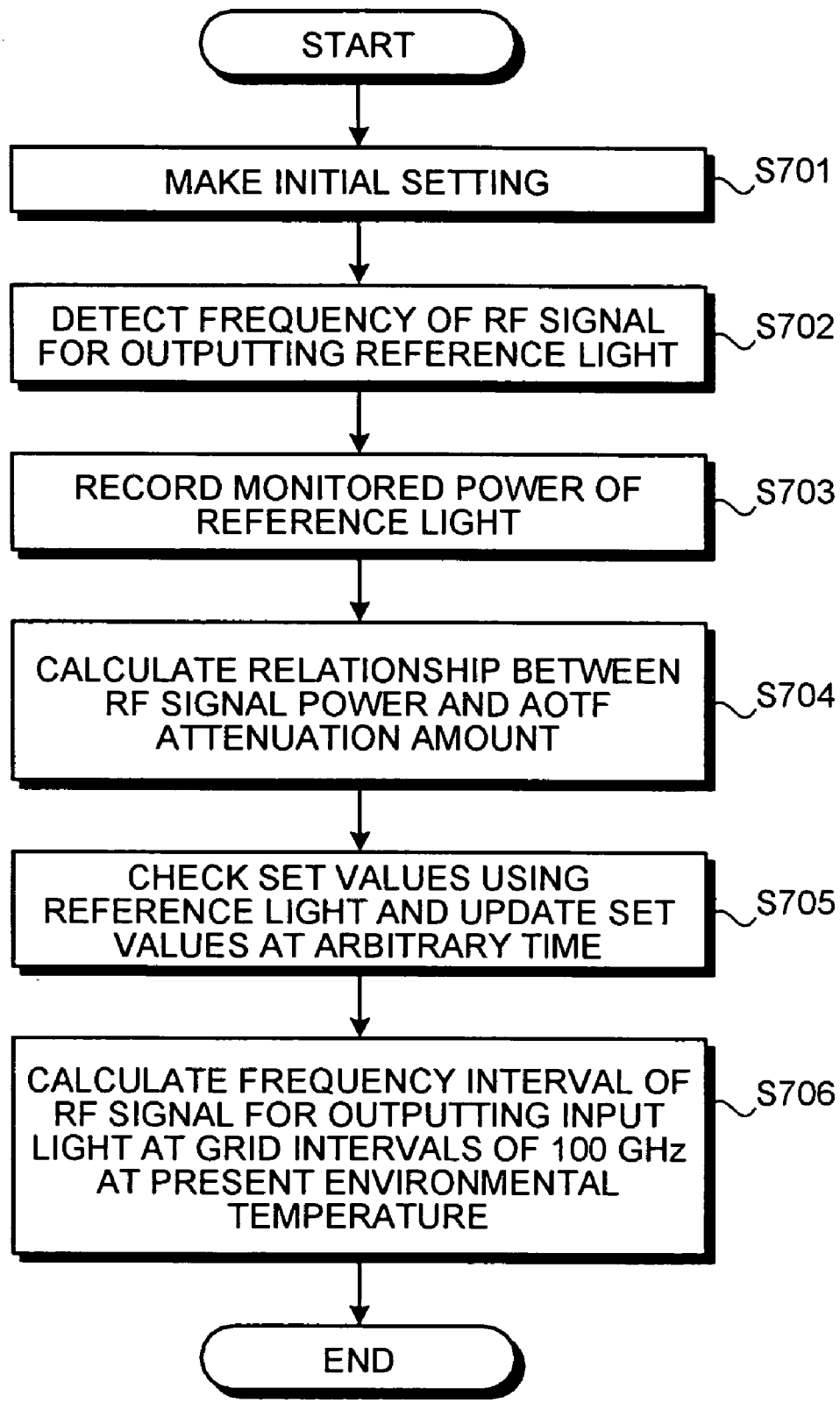
FIG. 7 is a flowchart of contents of an adjustment process performed by the AOTF apparatus according to the second embodiment.

FIG. 7 is a flowchart of contents of the adjustment process performed by the AOTF control apparatus 600 according to the second embodiment. In the flowchart of FIG. 7, the apparatus 600 makes an initial setting (at step S701). Specifically, the initial setting is made for preparing and recording the following variables and fixed values in a database of the DSP 109.

| Variables | |
|---|---|
| RFref freq | A frequency of an RF signal for outputting the reference light |
| RFref pwr x | A variable power of the reference light |
| AOTF5 pmon x | A monitored power at the output of the reference AOTF 111 for the port 5 |
| AOTF4 pmon x | A monitored power at the output of the AOTF for the port 4 |
| AOTF3 pmon x | A monitored power at the output of the AOTF for the port 3 |
| AOTF2 pmon x | A monitored power at the output of the AOTF for the port 2 |
| AOTF1 pmon x | A monitored power at the output of the AOTF for the port 1 |
| AOTF5 loss x | An attenuation amount of the reference AOTF |
| λref pmon | A monitored power of an output light for the reference light |
| ΔF | A frequency interval of the RF signal when a present optical signal at grid intervals of 100 gigahertz is output |
| TAOTF | A present temperature of the AOTF array 105 |
| λx | A wavelength of a light to be selected |
| Fx | A frequency of an RF signal for outputting a light at the wavelength of λx |
| Fref | A current frequency of an RF signal applied to a reference light |

| Fixed values | |
|---|---|
| RFref pwr a | An initial value of the power of the RF signal for outputting the reference light (at an RF signal frequency near a smallest transmission loss measured in advance) |

-continued

| | Fixed values |
|---|---|
| λref freq | A wavelength of the reference light |
| λref pwr | A power of the output light of the reference light |
| CPL loss | A loss of the multiplexing coupler 103 |
| a | ΔF at 0° C. |
| b | A gradient coefficient of a graph (relational equation that represents ΔF characteristics according to temperature) per 1° C. |
| λref | A wavelength of the reference light |

The AOTF control apparatus 600 detects the frequency of the RF signal for outputting the reference light (at step S702). Specifically, the apparatus 600 sets the initial value RFref pwr a to the power of the RF signal applied to the reference AOTF 111 to which the reference light is input. The apparatus 600 then reduces the frequency of the applied RF signal in scales from 180 megahertz to 1 kilohertz. The apparatus 600 detects a frequency of the RF signal that maximizes the optical power of the reference light from detected values by the optical monitor circuit 108. The apparatus 600 records this frequency as the frequency (RFref freq) of the RF signal for outputting the reference light.

The apparatus 600 causes the optical monitor circuit 108 to read and record the monitored power (λref pmon) of the reference light at the output of the reference light source unit 101 (at step S703.).

Thereafter, the apparatus 600 calculates the relationship between the RF signal power and the AOTF attenuation amount (at step S704). Specifically, the apparatus 600 applies an RF signal at the frequency (RFref freq) for outputting the reference light to the reference AOTF 111. The apparatus 600 reduces the power of the RF signal in 0.1-decibel scales from +10 dBm to −30 dBm, and reads and records the monitored power (AOTF5 pmon x) at the output of the reference AOTF 111 for every reduction value. Furthermore, the apparatus 600 subtracts the monitored power (λref pmon) of the reference light at the output of the reference light source unit 101 and the loss (CPL loss) of the multiplexing coupler 103 from the monitored power (AOTF5 pmon x) at the output of the reference AOTF 111. The apparatus 600 thereby calculates the attenuation amount (AOTF5 loss x) of the reference AOTF 111. The apparatus 600 records the relationship between the RF signal power and the attenuation amount of the reference AOTF 111 obtained by the recorded values and calculation result in the database of the DSP 109.

The apparatus 600 checks the set values using the reference light and updates them at arbitrary time (at step S705). In this process, the reference AOTF 111 performs a tracking process for tracking the optimum RF signal frequency and a confirmation process for confirming the relationship between the RF signal power and the attenuation amount to calculate the optimum RF signal frequency using the reference light so as to maintain the relationship between the optimum RF frequency and the RF signal power attenuation amount according to changes such as an environmental temperature change, a fluctuation in the light source of the WDM transmission signal, and a secular deterioration. Based on the change of the optimum RF signal frequency, the frequency of the RF signal for outputting the reference light is updated while considering a relative change of the frequency of the RF signal for outputting the reference light. According to this updating process, the frequency intervals of the RF signals corresponding to the channels of the WDM transmission signal are updated.

At the same time, the database that records the relationship between the RF signal power and the output light power is updated. In addition, the AOTF temperature (TAOTF) is monitored and recorded in the database. The AOTF temperature is always monitored to update the AOTF temperature to a latest value.

Finally, the apparatus 600 calculates a frequency interval of the RF signal for outputting the input light at grid intervals of 100 gigahertz at a present environmental temperature (at step S706), thus finishing the adjustment process. The present frequency interval (ΔF) of the RF signal at grid intervals of 100 gigahertz can be calculated by the following Equation (1).

$$\Delta F = a + b \times TAOTF \quad (1)$$

Figure 8:
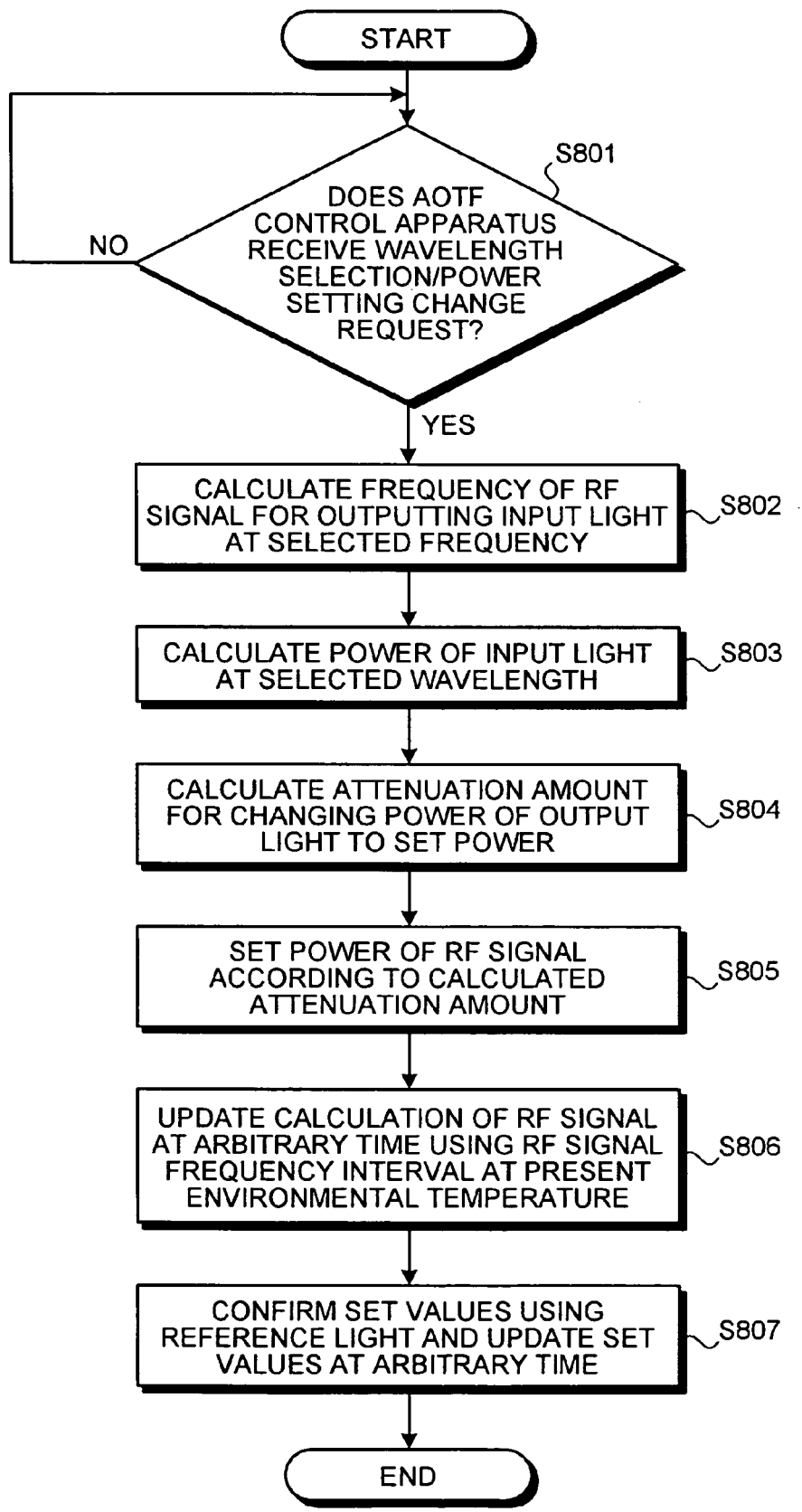
FIG. 8 is a flowchart of contents of an output light control process performed by the AOTF control apparatus according to the second embodiment.
Figure 9:
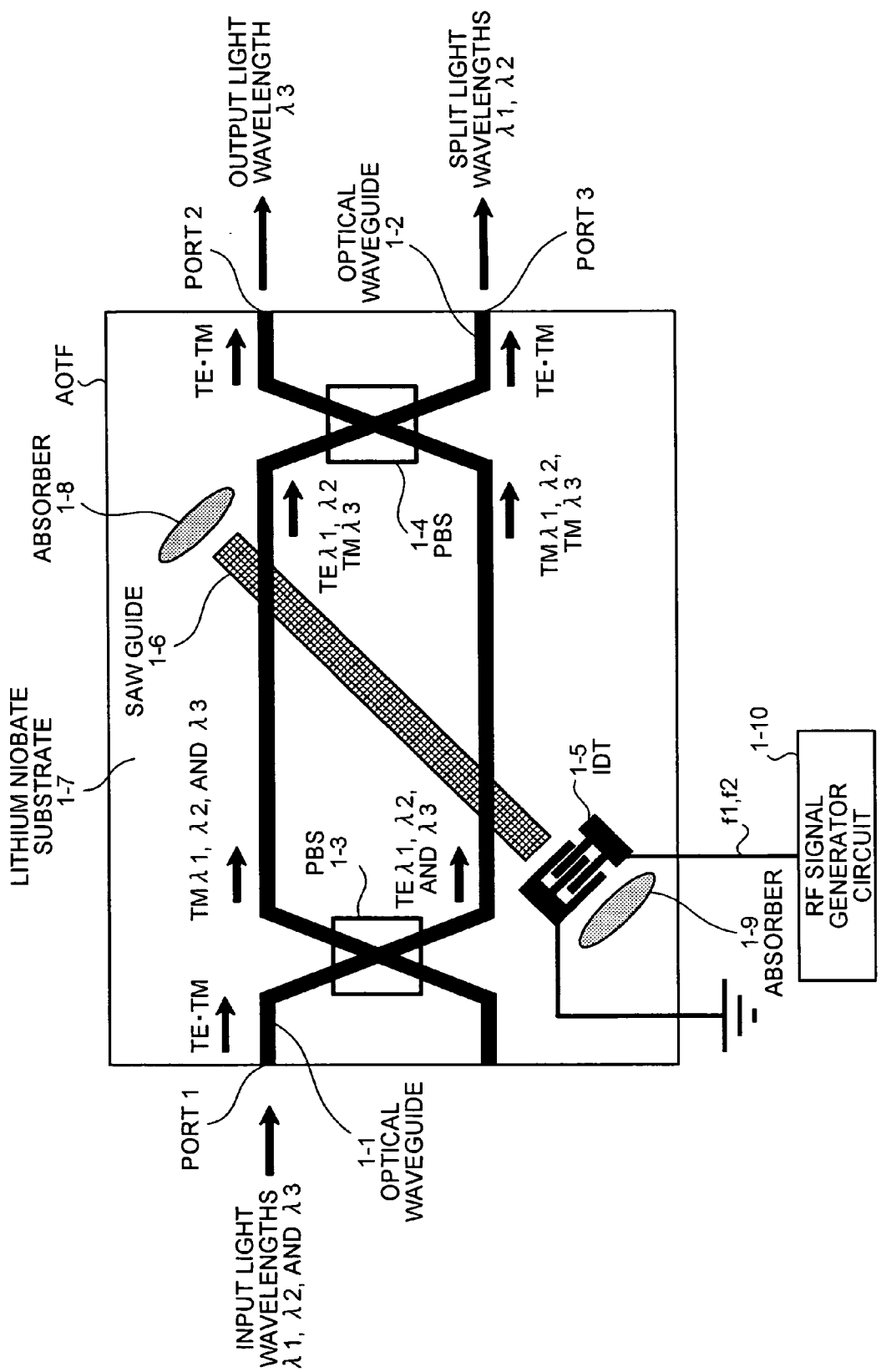
FIG. 9 is an explanatory view of a configuration of an AOTF.
Figure 10:
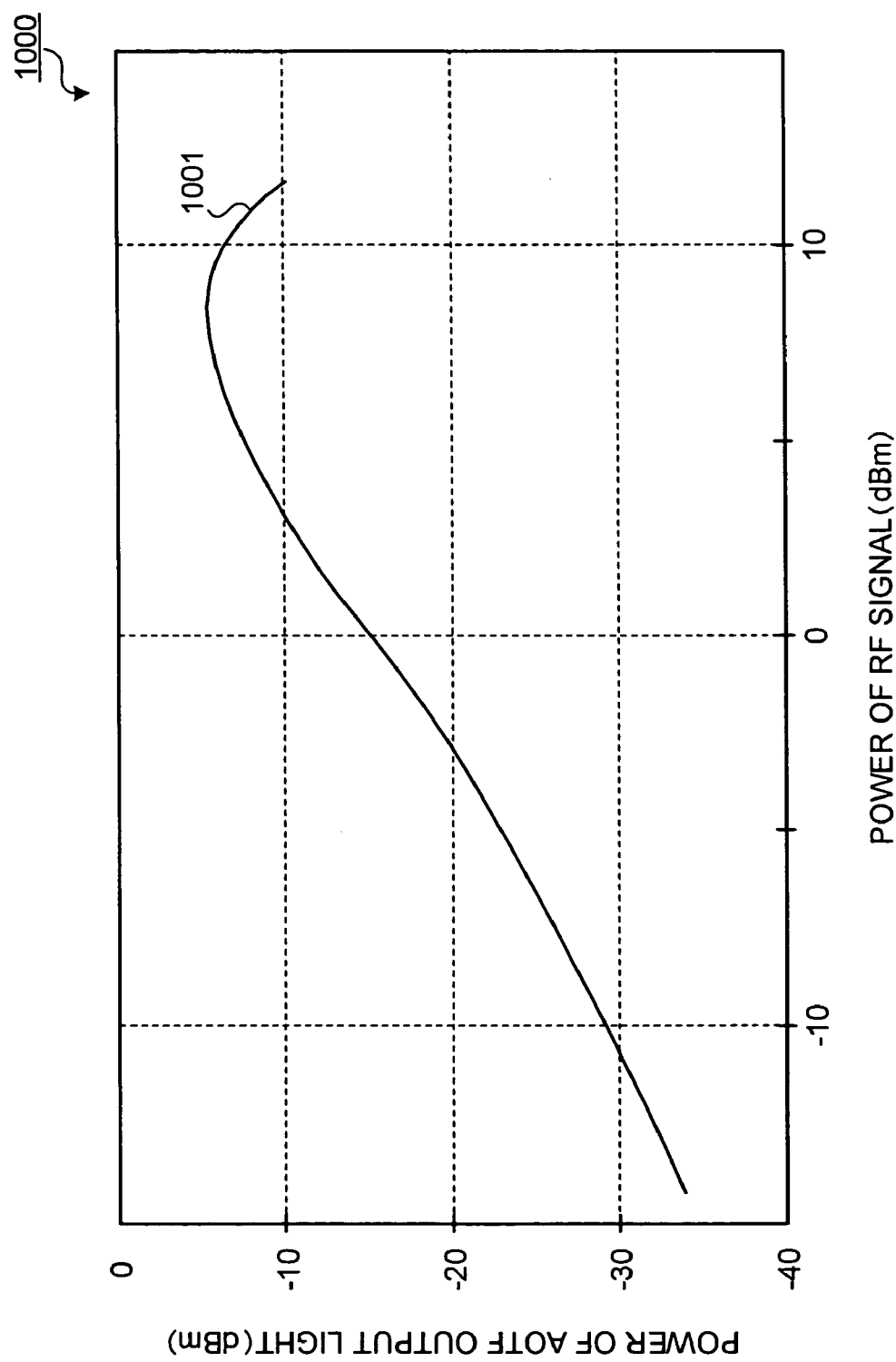
FIG. 10 is an explanatory view of a relationship between an RF signal and an AOTF output light.
Figure 11:
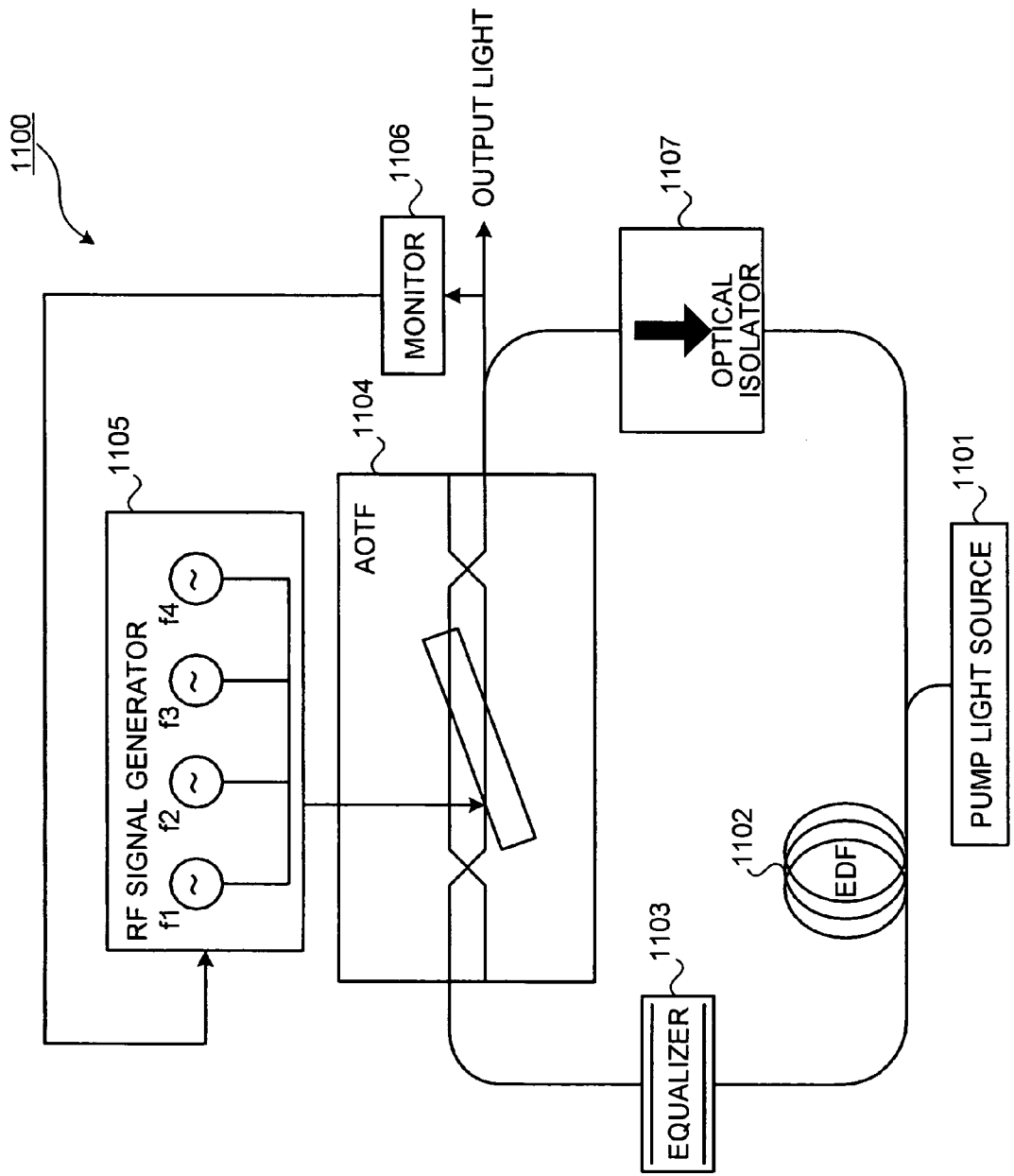
FIG. 11 is an explanatory view of a variable attenuator using a conventional AOTF (part 1)

After finishing the adjustment process having these contents, the AOTF control apparatus 600 can accept an optical control request from the user. FIG. 8 is a flowchart of contents of an output light control process performed by the AOTF control apparatus 600 according to the second embodiment. In the flowchart of FIG. 8, the apparatus 600 determines whether the apparatus 600 receives the wavelength selection/power setting change request from the user (at step S801). The apparatus 600 waits until receiving the user's wavelength selection/power setting change request (in a loop of step S801: No). If receiving the request (at step S801: Yes), the apparatus 600 calculates the frequency of the RF signal for outputting the input light at a selected wavelength (at step S802).

The process at the step S802 will be specifically explained. The apparatus 600 calculates the frequency (Fx) of the RF signal for outputting an optical signal at a selected channel by the following Equation (2) based on the to-be-selected wavelength ((x) of the optical signal, the present frequency (Fref) of the RF signal applied for the reference light, the RF signal frequency interval ((F) when the present optical signal in channels at grid intervals of 100 gigahertz, and the wavelength ((ref) of the reference light.

$$Fx = Frex + (Fx((\text{ref}-(x)/0.8 \quad (2)$$

The apparatus 600 then calculates a power of the input light at the selected wavelength (at step S803). Specifically, the apparatus 600 writes the frequency of the RF signal for outputting the optical signal at the selected wavelength calculated at the step S802, and the power of the RF signal at the smallest attenuation amount of the AOTF array 105 in a reference AOTF RF signal power and frequency storage register within the FPGA 110. In addition, the apparatus 600 sets the RF signal generator circuit 106 so that the RF signal at the power and the frequency thus written to the register to the reference AOTF 111. The optical monitor circuit 108 monitors the power of the output light of the reference AOTF 111, and calculates the power of the input optical power at the selected wavelength (e.g., (2) based on this monitored power and the attenuation amount set to the AOTF array 105.

The apparatus 600 calculates an attenuation amount for changing the power of the output light to a set power (at step S804). Specifically, the apparatus 600 calculates a difference between the power of the output light set by the user and the monitored power (λref pmon) of the output light for the reference light. In addition, the apparatus 600 calculates a necessary attenuation amount for changing the power of the output light to the set power.

The apparatus 600 sets the power of the RF signal according to the calculated attenuation amount (at step S805). Specifically, the apparatus 600 sets the frequency of the RF signal for outputting the optical signal at the selected wavelength and the power of the RF signal for outputting the light attenuated by as much as the attenuation amount calculated at the step S804 to the RF signal generator circuit 106. At this step, the apparatus 600 makes this setting under conditions that the power of the input light of the AOTF array 105 is higher than a sum of a desired output power and a minimum attenuation amount of the AOTF array 105.

Thereafter, the apparatus 600 update calculation of the RF signal at appropriate time using the RF signal frequency interval at the present environmental temperature (at step S806). In this process, the apparatus 600 applies the RF signal frequency (Fx) for outputting the light at the selected requested wavelength and a desired RF signal power acquired by tracking the power of the RF signal for the reference light source to the AOTF array 105. In addition, the apparatus 600 outputs (selects) the light at the requested wavelength. After selecting the light at the requested wavelength, the apparatus 600 continues to monitor tracking of the wavelength of the reference light and the temperature of the AOTF array 105. Whenever monitoring them, the apparatus 600 updates the RF signal frequency (Fx) for outputting the light at the selected requested wavelength using the Equations (1) and (2) and continues to apply the updated RF signal frequency (Fx) to the AOTF array 105.

Finally, the apparatus 600 checks the set values using the reference light and updates them at arbitrary time (at step S807), thus finishing the output light control process. This process is performed so as to maintain the relationship between the optimum RF signal frequency and the attenuation amount of the RF signal power for outputting the optical signal at the selected wavelength according to the changes such as the environmental temperature change, the fluctuation in the light source of the WDM transmission signal, and the secular deterioration. Specifically, the reference AOTF 111 performs the tracking process for tracking the optimum RF signal frequency and the confirmation process for confirming the relationship between the RF signal power and the attenuation amount using the reference light. In addition, based on the change of the optimum RF signal frequency, the frequency of the RF signal for outputting the reference light is updated while considering relative changes in the frequency of the RF signal for outputting the reference light. Based on this updating process, the database that records the RF frequency intervals and the relationship between the RF signal power and the output power is updated. According to these updating processes, the frequency intervals of the RF signal corresponding to the channels of the WDM transmission signal are updated. At the same time, the database that records the relationship between the RF signal power and the output power is updated. The AOTF control apparatus 100 can thereby operate with high accuracy.

In the first and the second embodiments, the optical control is exercised based on the value set as the optical power of the output light of the AOTF to be used. Alternatively, the optical control can be exercised by setting the attenuation amount.

As explained so far, according to the AOTF control apparatus and the optical control method, the intensity of the RF signal corresponding to the target power of the output light of the AOTF is calculated using the reference AOTF in advance, and set to the AOTF to be used. Therefore, it is possible to prevent an excessive optical power from being relayed to the apparatus connected in rear of the output of the AOTF to be used.

Furthermore, the intensity of the RF signal corresponding to the target power of the output light of the AOTF is calculated using the reference AOTF in advance, and set to the AOTF to be used. Therefore, wide attenuation characteristics of the AOTF to be used can effective function.

Furthermore, the transmission loss is always measured using the reference AOTF and the database is updated. Therefore, the influence of the changes such as the secular deterioration can be eliminated.

Furthermore, the target intensity of the RF signal is calculated in advance and applied using the integrated reference AOTF. Therefore, it is possible to eliminate the time and labor for individually making adjustments due to irregularities in the AOTFs.

As can be seen, according to the present invention, an arbitrary attenuation amount can be designated and the light at the selected wavelength can be attenuated without depending on the utilization environment and the secular deterioration in element. Therefore, the wavelength selecting function and the variable attenuation function can be realized by one element.

The optical control method explained in the embodiments can be realized by making a computer, such as a personal computer and a work station, execute a program that is prepared beforehand. The program is stored in a computer-readable recording medium, such as a hard disk, a flexible disk, a CD-ROM, a magneto-optical (MO), a digital versatile disk (DVD), and the like, and is executed by being read from the recording medium by the computer. The program can be a transmission medium that can be distributed via a network such as the Internet.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An acousto-optic tunable filter (AOTF) control apparatus that applies a radio frequency (RF) signal to an acousto-optic tunable filter (AOTF) to allow a selected light included in a wavelength-division multiplexing (WDM) transmission signal to pass through the AOTF to be dropped from the WDM transmission signal, comprising:
    a first calculating unit that calculates a relationship between a frequency of the RF signal and a wavelength of the selected light based on a frequency of the RF signal that allows a reference light of a predetermined wavelength to pass through the AOTF; and
    a second calculating unit that calculates a relationship between a power of the RF signal and an attenuation amount of the selected light based on an input power of the reference signal at the input of the AOTF and an output power of the reference signal at the output of the AOTF.

2. The AOTF control apparatus according to claim 1, wherein the first calculating unit includes:
    an output light detecting unit that detects a first output power and a second output power, wherein the first output power is a power of a first reference light of a first wavelength at the output of the AOTF, and the second output power is a power of a second reference light of a second wavelength at the output from the AOTF;
    a frequency detecting unit that detects, based on the first output power and the second output power, a first frequency and a second frequency of the RF signal that allow the first reference light and the second reference light to pass through the AOTF, respectively; and
    a calculating unit that calculates the relationship between the frequency of the RF signal and the wavelength of the selected light based on the first wavelength, the second wavelength, the first frequency, and the second frequency.

3. The AOTF control apparatus according to claim 2, wherein the frequency detecting unit detects a frequency maximizing the first output power as the first frequency, and a frequency maximizing the second output power as the second frequency.

4. The AOTF control apparatus according to claim 1, wherein the first calculating unit includes:
an output light detecting unit that detects an output power of the reference light at the output of the AOTF;
a frequency detecting unit that detects, based on the output power, a frequency of the RF signal that allows the reference light to pass through the AOTF;
a temperature detecting unit that detects a temperature of the AOTF; and
a calculating unit that calculates the relationship between the frequency of the RF signal and the wavelength of the selected light based on the predetermined wavelength of the reference light, the frequency of the RF signal detected by the frequency detecting unit, and the temperature of the AOTF detected by the temperature detecting unit.

5. The AOTF control apparatus according to claim 4, wherein the frequency detecting unit detects a frequency maximizing the output power as the frequency of the RF signal that allows the reference light to pass through the AOTF.

6. The AOTF control apparatus according to claim 1, wherein the second calculating unit includes:
an input light detecting unit that detects, when the RF signal that allows the reference light to pass through the AOTF is applied to the AOTF, an input power of the reference light at the input of the AOTF;
an output light detecting unit that detects, when the RF signal that allows the reference light to pass through the AOTF is applied to the AOTF, an output power of the reference light at the output of the AOTF; and
a calculating unit that calculates the relation between the power of the RF signal and the attenuation amount that is calculated based on the input power and the output power.

7. The AOTF control apparatus according to claim 1, wherein the predetermined wavelength of the reference light is out of a bandwidth of the WDM transmission signal.

8. The AOTF control apparatus according to claim 1, further comprising a third calculating unit that calculates, based on the relationship calculated by the first calculating unit, a frequency of the RF signal corresponding to an arbitrary wavelength of the selected light requested by a user 9. The AOTF control apparatus according to claim 1, further comprising a third calculating unit that calculates, based on the relationship calculated by the second calculating unit, a power of the RF signal corresponding to an arbitrary attenuation amount of the selected light requested by a user.

10. A control method of an acousto-optic tunable filter (AOTF) by applying a radio frequency (RF) signal to the AOTF to allow a selected light included in a wavelength-division multiplexing (WDM) transmission signal to pass through the AOTF to be dropped from the WDM transmission signal, comprising:
calculating a relationship between a frequency of the RF signal and a wavelength of the selected light based on a frequency of the RF signal that allows a reference light of a predetermined wavelength to pass through the AOTF; and
calculating a relationship between a power of the RF signal and an attenuation amount of the selected light based on an input power of the reference signal at the input of the AOTF and an output power of the reference signal at the output of the AOTF.

11. An apparatus comprising:
an acousto-optic tunable filter (AOTF) array comprising a plurality of AOTFs, one of the AOTFs being a reference AOTF;
the reference AOTF having an input at which the reference AOTF inputs a wavelength division multiplexed (WDM) signal and a reference signal, wherein a radio frequency (RF) signal applied to the reference AOTF causes a selected light included in the WDM signal to pass through the reference AOTF;
a first calculating unit calculating a relationship between a frequency of the RF signal and a wavelength of the selected light that allows the reference light to pass through the reference AOTF and thereby be output from an output of the reference AOTF; and
a second calculating unit calculating a relationship between a power of the RF signal and an attenuation amount of the selected light by the reference AOTF based on an input power of the reference signal at the input of the reference AOTF and an output power of the reference signal at the output of the reference AOTF,
wherein the apparatus controls at least one of a temperature of the AQTF array, attenuation amount of the AOTF array, or power of the RF signal applied to the reference AOTF in accordance with the calculations.

12. An apparatus according to claim 11, wherein the power of the RF signal applied to the reference AOTF is controlled.

13. An apparatus according to claim 11, wherein the temperature of the AOTF array is controlled.

14. An apparatus according to claim 11, wherein the attenuation amount of the AOTF array is controlled.

* * * * *

UNITED STATES PATENT AND TRADEMARK OFFICE
CERTIFICATE OF CORRECTION

PATENT NO. : 7,405,858 B2 Page 1 of 1
APPLICATION NO. : 11/443114
DATED : July 29, 2008
INVENTOR(S) : Masaji Noguchi et al.

It is certified that error appears in the above-identified patent and that said Letters Patent is hereby corrected as shown below:

Column 17, Line 51, after "user" insert --.--.

Column 18, Line 42, change "AQTF" to --AOTF--.

Signed and Sealed this

Twenty-fifth Day of November, 2008

JON W. DUDAS
*Director of the United States Patent and Trademark Office*